W. L. PATTERSON.
OPERATING TABLE ILLUMINATOR.
APPLICATION FILED APR. 18, 1917.
1,277,111.
Patented Aug. 27, 1918.
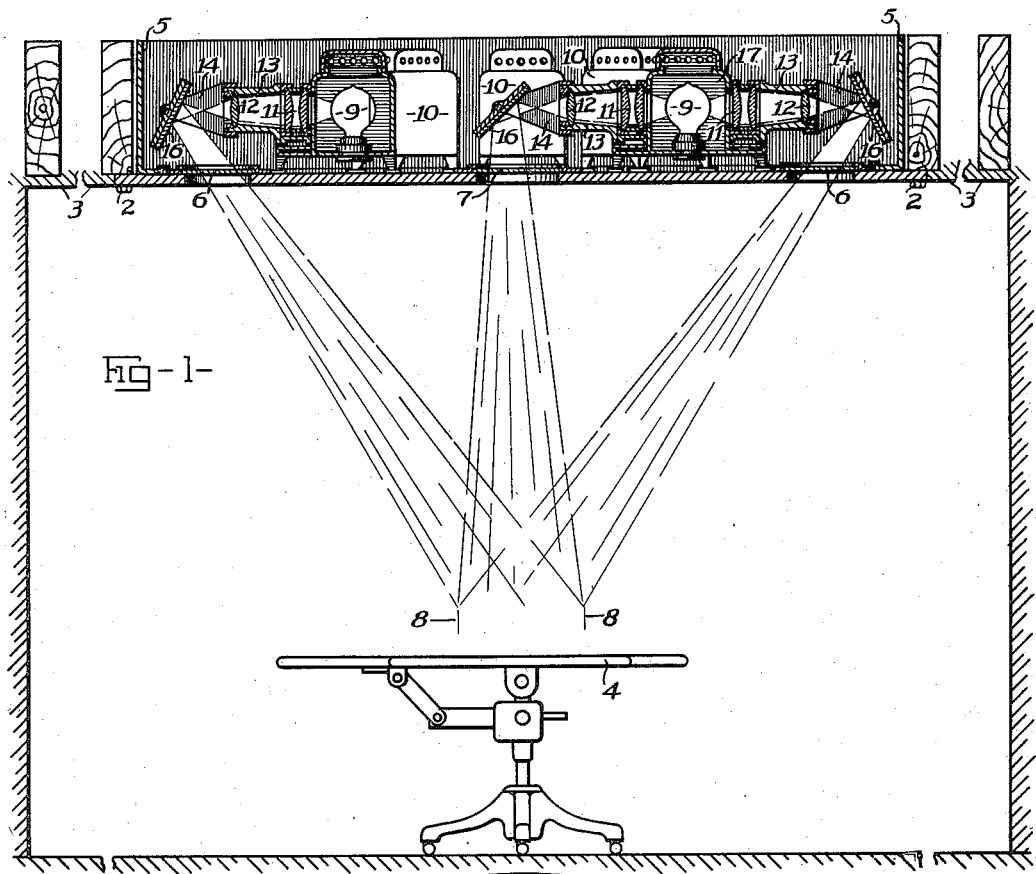
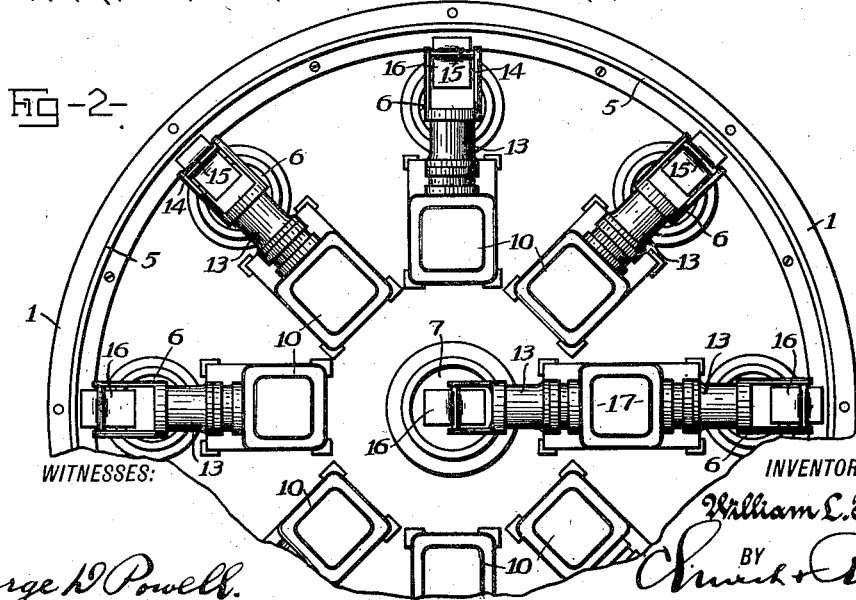
WITNESSES:
George D. Powell.
INVENTOR
William L. Patterson
BY
his ATTORNEYS

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

OPERATING-TABLE ILLUMINATOR.

1,277,111.           Specification of Letters Patent.     Patented Aug. 27, 1918.

Application filed April 18, 1917. Serial No. 162,985.

*To all whom it may concern:*

Be it known that I, WILLIAM L. PATTERSON, a citizen of the United States, residing at Rochester, in the county of Monroe, State of New York, have invented certain new and useful Improvements in Operating-Table Illuminators; and I do declare the following to be a full, clear, and exact description of the same, reference being had to the accompanying drawings, forming a part of this specification, and to the characters of reference marked thereon.

This invention relates to light projectors for illuminating a restricted area, such as the field of operation of a surgeon upon a patient laid upon an operating table placed below the illuminator.

It is important that the field of a surgical operation be brilliantly illuminated without casting disturbing shadows of the surgeon's hands or implements upon the operative field, and without raising the temperature of the parts being operated upon, and without allowing fall thereon of dust or dirt from the illuminator which if permitted may infect the patient. These conditions are fully met while using this invention which assures an artificial illumination of an operative field or other restricted area substantially as adequate and effective as that afforded by bright daylight.

One special object of this invention is to provide an illuminating apparatus having very large and intense lighting capacity or effect and adapted to direct most of its light in a plurality of divergent beams deflected in different directions upon a comparatively small area or field of operation to be brilliantly illuminated.

Another special object is to arrange each of the light sources or lamps and its coacting projecting lens system and light reflector in a self-contained unitary structure the optical elements of which originally have correct relative optical adjustments which will be permanently maintained irrespective of possible warping or distortion of the casing or support by which the illuminator is held in operative position.

A further special object is to provide for complete protection of all the optical elements of the illuminator, including the light reflectors, from dust and dirt thus minimizing the danger of infecting the patient; and also to protect all of the light sources and optical elements from fluids used to antiseptically cleanse exposed parts of the illuminator or the operating room in which it is installed.

In the drawings:

Figure 1, is a vertical sectional elevation of a preferred embodiment of this improved illuminator as arranged over an operating table, and with the deflected light beams indicated by broken lines. Fig. 2 is a top plan view of the illuminator removed from its ceiling supports and partly broken away.

Substantially all parts of this illuminator are inclosed within a casing having a face plate or wall 1 which in the illustrated illuminator is a bottom wall secured by screws or bolts 2 to the ceiling 3 of an operating room above an operating table 4. This sheet metal face plate 1 may be round and may have a diameter of ten or twelve feet and to it is fastened a vertical marginal reinforcing sheet metal wall plate 5 which also assures a semi-fireproof construction of the entire illuminator casing parts 1, 5, when set in the room ceiling 3 within its wooden beam or rafter supports. The face plate 1 is preferably set in flush or nearly so with the ceiling 3, to minimize accumulation of dust or dirt upon the casing and thus minimize the danger of infection by dust falling on the field of a surgical operation upon a patient lying on the table 4. The wall 1 has a plurality of outer openings closed by transparent portions 6, and a central opening closed by a transparent portion 7, said parts 6, 7, preferably being panes of transparent or translucent glass fixedly held by any suitable frame or fastening to the inner face of the casing wall 1.

All of the light sources, and all of the optical elements of this invention including the light beam reflectors, are protectively inclosed within the illuminator casing which is practically proof against entrance from the operating room of dust and dirt or of washing or spraying fluid used to cleanse the exposed illuminator face or the operating room. Relatively to this inclosure of the light sources and optical elements it is not essential that these be arranged in the form of the preferred hereinafter described unitary optical projectors, as this invention comprehends the use of a casing having transparent wall portions, and a plurality of coacting light sources, projecting lenses and reflectors which may be relatively mounted within the casing in any manner causing the reflectors which receive light rays from the respective lenses to deflect such rays in different directions in laterally converged beams which pass through the respective outer transparent wall portions 6 of the casing and fall upon a common area to be illuminated. The incased projection lens systems may or may not include coacting condensing lenses and objectives but use of these is preferred as it assures projection from the objectives upon the reflectors of divergent light beams which the several reflectors bend in divergent beams which pass through opposed transparent wall portions of the casing and fall upon and spread over the entire area of a restricted illuminated field of operation encompassed by the line 8, 8, in Fig. 1 of the drawings.

Special advantages are derived from the use in this invention of a plurality of unitary optical projectors arranged within the casing in a circular group and each including a light source which preferably is an incandescent electric lamp 9 located in a lamp house 10 to which a preferred projection lens system comprising an alined condenser 11 and an objective 12, is held in a mounting 13 supported by the lamp house. Each lens mounting 13 carries at its outer end a yoke or forked bracket 14 in which is fitted snugly but movably the pivot shaft 15 of a reflector 16 which is adjustable relatively to the diverging light beam it receives from the objective 12, to cause it to deflect said beam with gradually increasing divergency through the subjacent transparent casing wall portion 6 and upon the common area 8 to be illuminated. The unitary optical projectors when once properly grouped relatively to the transparent casing wall portions 6 may be fastened at their lamp house bases to the casing wall 1 in any approved manner.

The drawings show but one of the optical projectors generally marked 17, specially formed as a twin or double-head projector unit having a central lamp 9; and two projection lens systems 11, 12, and a coacting reflector 16 arranged radially in alinement at opposite ends of the lamp house so that the outer reflector 16 deflects a diverging light beam downward and inward through the subjacent outer transparent casing wall portion 6 upon the common illuminated area 8, and the inner reflector 16 deflects a divergent light beam directly downward through the subjacent central transparent casing wall portion 7, upon the same illuminated area. To promote convenience in illustration but one of the eight unitary projectors is shown in twin form with a lens system and reflector at each end, but in practice any number of the projectors may be so made, say every other one, which would provide eight diverging light beams convergently passing through the eight outer transparent casing portions 6 upon the central illuminated area 8, and four diverging light beams directed through a larger transparent central wall portion 7 upon the same restricted area, or twelve diverging light beams convergently directed upon the same small area. Such a powerful illuminator has been installed and has in use proved as effective as brilliant daylight during difficult and dangerous prolonged surgical operations upon patients lying on the table 4 beneath the illuminator, as all shadows cast by the surgeon's hands or implements are dissolved by the insurging light beams from a majority of the reflectors which are not obstructed by the surgeon during progress of the operation.

It is obvious that employment of the above named unitary projectors, of either the single reflector type or the double reflector type, assures that all of their optical elements including the coacting lamp, lens system or systems and reflectors which are originally set up in true optical relation, must retain this originally true relation notwithstanding possible shrinking or warping of the casing or support in and by which the projectors are sustained in operative position. Furthermore, these unitary projectors may be used in an illuminator such as that described in my co-pending patent application Serial No. 162,285, filed April 16, 1917, in which the lamp and lens systems are located in a casing arranged below the operating room ceiling and the reflectors are outside of the casing. In such adaptation of a part of this invention it would only be necessary to set the unitary projectors within the casing and have the lens mountings 13 project through the outer vertical casing wall, outside of which the reflectors 16 would then be located, all as will readily be understood.

Having thus described my invention, what I claim and desire to secure by Letters Patent of the United States is:

1. An illuminator comprising a casing having transparent wall portions, and a plurality of grouped unitary optical projectors each including a coacting light source, projecting lens and reflector; all of the unitary projectors being positioned within the casing to have the light rays from the individual reflectors of the several projectors convergently pass through opposed transparent wall portions of the casing and fall upon a common area to be illuminated.

2. An illuminator comprising a casing having transparent wall portions, and a plurality of grouped unitary optical projectors each including a coacting light source, condenser, objective and reflector; all of the unitary projectors being positioned within the casing to have the diverging light rays from the individual reflectors of the several projectors pass convergently through opposed transparent wall portions of the casing and fall upon a common area to be illuminated.

3. An illuminator comprising a casing having a plurality of outer transparent wall portions and a central transparent wall portion, and a plurality of unitary optical projectors grouped within the casing, each projector including a coacting light source and outer projecting lens and reflector, one or more of the unitary projectors also having an inner projecting lens and reflector, whereby the light beams from the outer reflectors of all the projectors are deflected convergently through the respective outer transparent wall portions of the casing upon a common area to be illuminated and the light beams from the inner projector reflector are deflected through the central transparent wall portion of the casing upon the same illuminated area.

4. An illuminator comprising a casing having a plurality of outer transparent wall portions and a central transparent wall portion, and a plurality of unitary optical projectors grouped within the casing, each projector including a coacting light source and an outer condenser, objective and reflector, one or more of the unitary projectors also having an inner condenser, objective and reflector, whereby the diverging light beams from the outer reflectors of all the projectors are deflected convergently through the respective outer transparent wall portions of the casing upon a common area to be illuminated, and the diverging light beams from the inner projector reflector, are deflected through the central transparent wall portion of the casing upon the same illuminated area.

WILLIAM L. PATTERSON.